United States Patent
Gandhi et al.

(10) Patent No.: US 11,227,189 B2
(45) Date of Patent: Jan. 18, 2022

(54) SYSTEMS AND METHODS FOR IDENTIFYING ITEMS IN A DIGITAL IMAGE

(71) Applicant: Walmart Apollo, LLC, Bentonville, AR (US)

(72) Inventors: Shreyansh Prakash Gandhi, Milpitas, CA (US); Alessandro Magnani, Menlo Park, CA (US); Theban Stanley, San Bruno, CA (US); Qian Li, Sunnyvale, CA (US); Abilash Amarthaluri, San Jose, CA (US); Abon Chaudhuri, Sunnyvale, CA (US); Behzad Ahmadi, San Jose, CA (US); Omer Ovenc, San Jose, CA (US); Venkatesh Kandaswamy, San Ramon, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 152 days.

(21) Appl. No.: 16/514,818

(22) Filed: Jul. 17, 2019

(65) Prior Publication Data
US 2021/0019567 A1    Jan. 21, 2021

(51) Int. Cl.
| | |
|---|---|
| *G06T 11/60* | (2006.01) |
| *G06K 9/62* | (2006.01) |
| *G06K 9/00* | (2006.01) |
| *G06F 16/955* | (2019.01) |
| *G06N 3/08* | (2006.01) |
| *G06F 3/0482* | (2013.01) |
| *G06N 3/04* | (2006.01) |

(52) U.S. Cl.
CPC ......... *G06K 9/6257* (2013.01); *G06F 3/0482* (2013.01); *G06F 16/9558* (2019.01); *G06K 9/00671* (2013.01); *G06K 9/6215* (2013.01); *G06N 3/08* (2013.01); *G06T 11/60* (2013.01); *G06N 3/04* (2013.01)

(58) Field of Classification Search
CPC .... G06K 9/00671; G06K 9/6257; G06N 3/08; G06N 3/04; G06T 11/60
See application file for complete search history.

(56) References Cited

U.S. PATENT DOCUMENTS

| | | | |
|---|---|---|---|
| 9,767,480 B1* | 9/2017 | Gottlieb | G06Q 30/0277 |
| 2011/0191374 A1* | 8/2011 | Bengio | G06F 16/50 |
| | | | 707/780 |
| 2013/0259308 A1* | 10/2013 | Klusza | G06F 30/13 |
| | | | 382/103 |
| 2014/0293353 A1* | 10/2014 | Nagata | H04N 1/32101 |
| | | | 358/1.15 |

(Continued)

*Primary Examiner* — Sam Bhattacharya
(74) *Attorney, Agent, or Firm* — Bryan Cave Leighton Paisner LLP

(57) ABSTRACT

Systems and methods including one or more processors and one or more non-transitory storage devices storing computing instructions configured to run on the one or more processors and perform acts of receiving a digital image comprising multiple items; determining an embedding for the digital image using a machine learning algorithm trained on one or more combined digital images, the combined digital image comprising one or more annotated digital images; identifying an item of the multiple items in the digital image; and facilitating an alteration of a GUI on an electronic device in response to identifying the item in the digital image.

20 Claims, 8 Drawing Sheets

(56) References Cited

U.S. PATENT DOCUMENTS

2016/0080451 A1\* 3/2016 Morton .............. H04N 21/8456
709/219
2020/0226661 A1\* 7/2020 Lan ...................... G06K 9/6223
2020/0367422 A1\* 11/2020 Shniberg ................. G06T 7/001

\* cited by examiner

SYSTEMS AND METHODS FOR IDENTIFYING ITEMS IN A DIGITAL IMAGE

TECHNICAL FIELD

This disclosure relates generally to machine vision systems, and more particularly related to systems and methods for identifying items displayed in images comprising multiple items.

BACKGROUND

As the progress of artificial intelligence technologies continues to move forward, the need for accurate machine vision systems is becoming more apparent. Development of these machine vision systems, though, suffers from a number of problems. Specifically, training the machine learning algorithms used to operate these systems is not only computationally intense, but also expensive from a budgetary perspective. These expenses are due to the fact that in the past, training data sets for the machine learning algorithms that operate machine vision systems had to be developed de novo. For example, large collections of images used to train machine learning algorithms had to be either manually labeled prior to training the machine learning algorithm or, in automated systems, computationally intensive labeling algorithms need to be used. Therefore, there is a need for bootstrapped systems and methods that reduce the computational intensity of automated labeling systems for creating machine learning algorithms that operate machine vision systems.

BRIEF DESCRIPTION OF THE DRAWINGS

To facilitate further description of the embodiments, the following drawings are provided in which.

Figure 1:
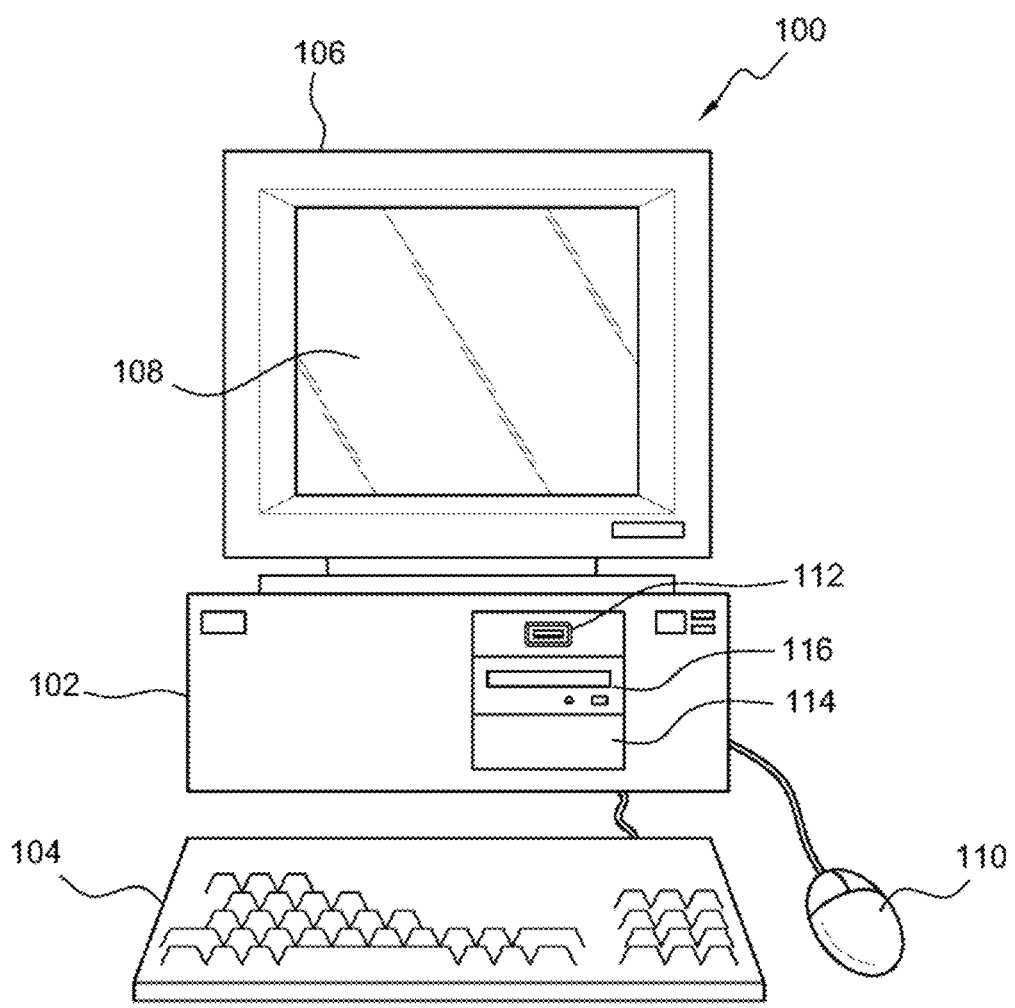
FIG. 1 illustrates a front elevational view of a computer system that is suitable for implementing various embodiments of the systems disclosed in FIG. 3.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "real-time" can, in some embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term "real time" encompasses operations that occur in "near" real time or somewhat delayed from a triggering event. In a number of embodiments, "real time" can mean real time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately one second, two seconds, five seconds, or ten seconds.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

A number of embodiments can include a system. The system can include one or more processors and one or more non-transitory storage devices storing computing instructions configured to run on the one or more processors. The computing instructions can be configured to run on the one or more processors and perform acts of receiving one or more digital images from a repository of digital images; annotating the one or more digital images from the repository of digital images; digitally altering the one or more digital images, as annotated, from the repository of digital images; digitally combining the one or more digital images, as annotated and digitally altered, with at least one or more portions of one or more other digital images of the repository of digital images to create one or more combined digital images; training a machine learning algorithm on the one or more combined digital images; and storing the machine learning algorithm, as trained, in the one or more non-transitory computer readable storage devices.

Various embodiments include a method. The method can include receiving one or more digital images from a repository of digital images; annotating the one or more digital images from the repository of digital images; digitally altering the one or more digital images, as annotated, from the repository of digital images; digitally combining the one or more digital images, as annotated and digitally altered, with at least one or more portions of one or more other digital images of the repository of digital images to create one or more combined digital images; training a machine learning algorithm on the one or more combined digital images; and storing the machine learning algorithm, as trained, in the one or more non-transitory computer readable storage devices.

A number of embodiments can include a system. The system can include one or more processors and one or more non-transitory storage devices storing computing instructions configured to run on the one or more processors. The computing instructions can be configured to run on the one or more processors and perform acts of receiving a digital image comprising multiple items; determining an embedding for the digital image using a machine learning algorithm trained on one or more combined digital images, the combined digital image comprising one or more annotated digital images; identifying an item of the multiple items in the digital image; and facilitating an alteration of a GUI on an electronic device in response to identifying the item in the digital image.

Various embodiments include a method. The method can include receiving a digital image comprising multiple items; determining an embedding for the digital image using a machine learning algorithm trained on one or more combined digital images, the combined digital image comprising one or more annotated digital images; identifying an item of the multiple items in the digital image; and facilitating an alteration of a GUI on an electronic device in response to identifying the item in the digital image.

Figure 2:
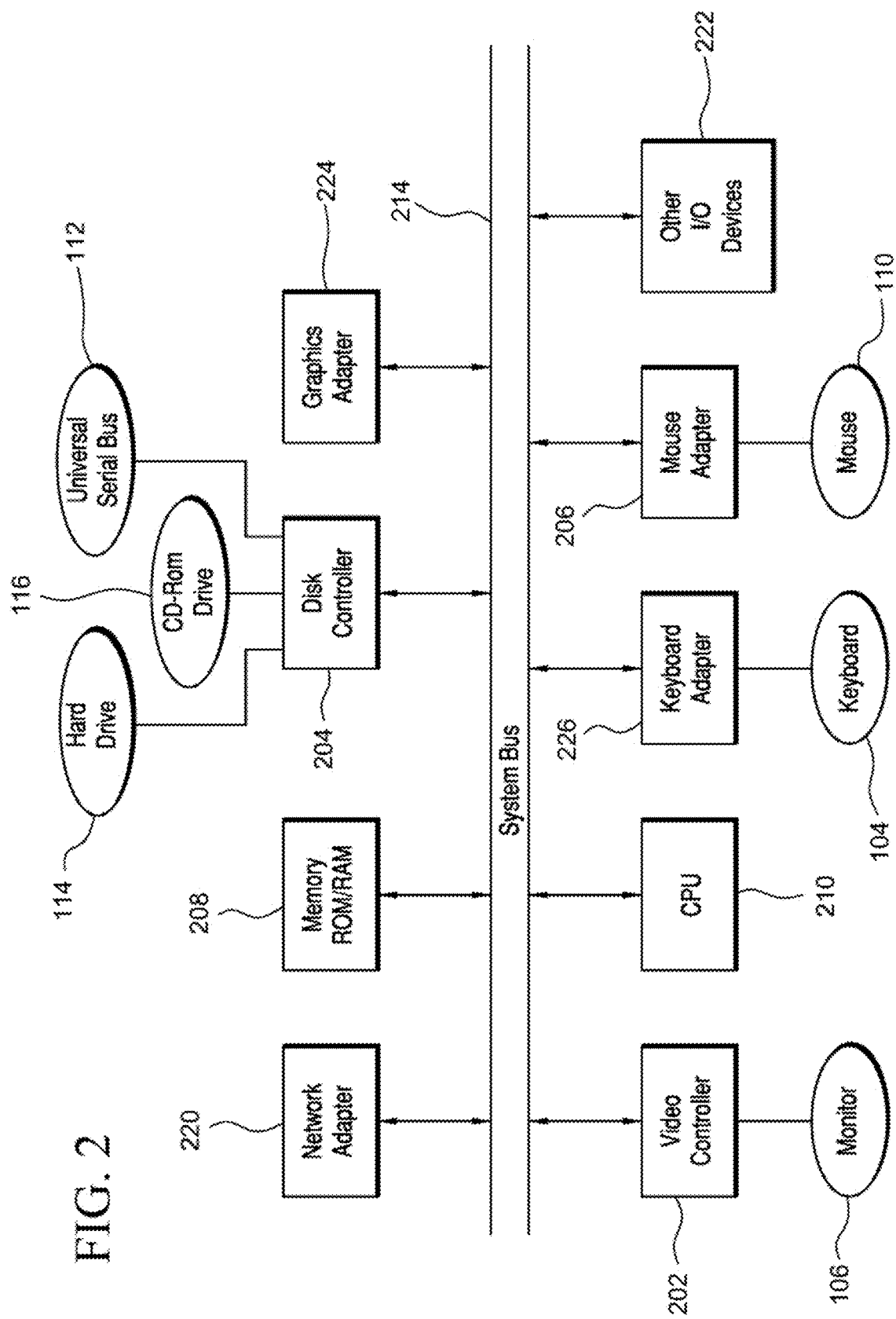
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the memory storage modules described herein. As an example, a different or separate one of a chassis 102 (and its internal components) can be suitable for implementing part or all of one or more embodiments of the techniques, methods, and/or systems described herein. Furthermore, one or more elements of computer system 100 (e.g., a monitor 106, a keyboard 104, and/or a mouse 110, etc.) also can be appropriate for implementing part or all of one or more embodiments of the techniques, methods, and/or systems described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to a memory storage unit 208, where memory storage unit 208 can comprise (i) non-volatile memory, such as, for example, read only memory (ROM) and/or (ii) volatile memory, such as, for example, random access memory (RAM). The non-volatile memory can be removable and/or non-removable non-volatile memory. Meanwhile, RAM can include dynamic RAM (DRAM), static RAM (SRAM), etc. Further, ROM can include mask-programmed ROM, programmable ROM (PROM), one-time programmable ROM (OTP), erasable programmable read-only memory (EPROM), electrically erasable programmable ROM (EEPROM) (e.g., electrically alterable ROM (EAROM) and/or flash memory), etc. In these or other embodiments, memory storage unit 208 can comprise (i) non-transitory memory and/or (ii) transitory memory.

In various examples, portions of the memory storage module(s) of the various embodiments disclosed herein (e.g., portions of the non-volatile memory storage module(s)) can be encoded with a boot code sequence suitable for restoring computer system 100 (FIG. 1) to a functional state after a system reset. In addition, portions of the memory storage module(s) of the various embodiments disclosed herein (e.g., portions of the non-volatile memory storage module(s)) can comprise microcode such as a Basic Input-Output System (BIOS) operable with computer system 100 (FIG. 1). In the same or different examples, portions of the memory storage module(s) of the various embodiments disclosed herein (e.g., portions of the non-volatile memory storage module(s)) can comprise an operating system, which can be a software program that manages the hardware and software resources of a computer and/or a computer network. The BIOS can initialize and test components of computer system 100 (FIG. 1) and load the operating system. Meanwhile, the operating system can perform basic tasks such as, for example, controlling and allocating memory, prioritizing the processing of instructions, controlling input and output devices, facilitating networking, and managing files. Exemplary operating systems can comprise one of the following: (i) Microsoft® Windows® operating system (OS) by Microsoft Corp. of Redmond, Wash., United States of America, (ii) Mac® OS X by Apple Inc. of Cupertino, Calif., United States of America, (iii) UNIX® OS, and (iv) Linux® OS. Further exemplary operating systems can comprise one of the following: (i) the iOS® operating system by Apple Inc. of Cupertino, Calif., United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, Calif., United States of America, (v) the Windows Mobile™ operating system by Microsoft Corp. of Redmond, Wash., United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processing modules of the various embodiments disclosed herein can comprise CPU 210.

Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs. In many embodiments, an application specific integrated circuit (ASIC) can comprise one or more processors or microprocessors and/or memory blocks or memory storage.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to keyboard 104 (FIGS. 1-2) and mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM drive 116 (FIGS. 1-2). In other embodiments, distinct units can be used to control each of these devices separately.

Network adapter 220 can be suitable to connect computer system 100 (FIG. 1) to a computer network by wired communication (e.g., a wired network adapter) and/or wireless communication (e.g., a wireless network adapter). In some embodiments, network adapter 220 can be plugged or coupled to an expansion port (not shown) in computer system 100 (FIG. 1). In other embodiments, network adapter 220 can be built into computer system 100 (FIG. 1). For example, network adapter 220 can be built into computer system 100 (FIG. 1) by being integrated into the motherboard chipset (not shown), or implemented via one or more dedicated communication chips (not shown), connected through a PCI (peripheral component interconnector) or a PCI express bus of computer system 100 (FIG. 1) or USB port 112 (FIG. 1).

Returning now to FIG. 1, although many other components of computer system 100 are not shown, such components and their interconnection are well known to those of ordinary skill in the art. Accordingly, further details concerning the construction and composition of computer system 100 and the circuit boards inside chassis 102 are not discussed herein.

Meanwhile, when computer system 100 is running, program instructions (e.g., computer instructions) stored on one or more of the memory storage module(s) of the various embodiments disclosed herein can be executed by CPU 210 (FIG. 2). At least a portion of the program instructions, stored on these devices, can be suitable for carrying out at least part of the techniques and methods described herein.

Further, although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile electronic device, such as a smartphone. In certain additional embodiments, computer system 100 may comprise an embedded system.

Figure 3:
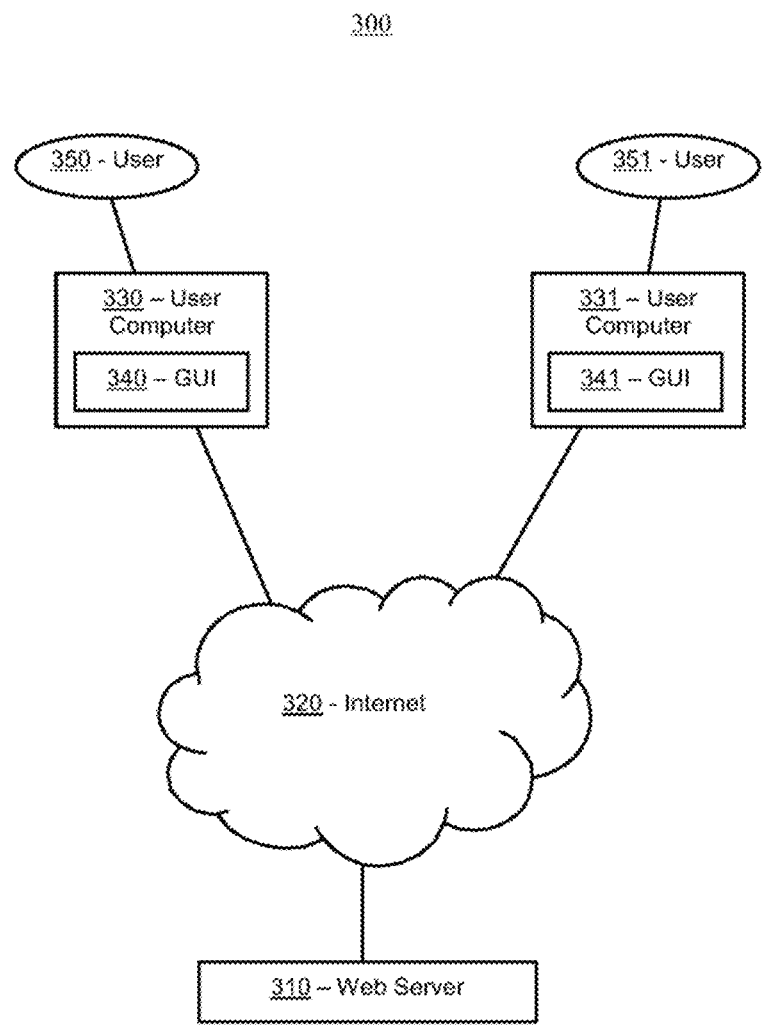
FIG. 3 illustrates a representative block diagram of a system, according to an embodiment.

Turning ahead in the drawings, FIG. 3 illustrates a block diagram of a system 300 that can be employed for identifying items in a digital image, as described in greater detail below. System 300 is merely exemplary and embodiments of the system are not limited to the embodiments presented herein. System 300 can be employed in many different embodiments or examples not specifically depicted or described herein. In some embodiments, certain elements or modules of system 300 can perform various procedures, processes, and/or activities. In these or other embodiments, the procedures, processes, and/or activities can be performed by other suitable elements or modules of system 300.

Generally, therefore, system 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

In some embodiments, system 300 can include a web server 310 and/or an Internet 320. Web server 310 and/or internet 320 can each be a computer system, such as computer system 100 (FIG. 1), as described above, and can each be a single computer, a single server, or a cluster or collection of computers or servers, or a cloud of computers or servers. In another embodiment, a single computer system can host each of two or more of web server 310 and/or internet 320. Additional details regarding web server 310 and/or user internet 320 are described herein.

In many embodiments, system 300 also can comprise user computers 330, 331. User computers 330, 331 can comprise any of the elements described in relation to computer system 100. In some embodiments, user computers 330, 331 can be mobile devices. A mobile electronic device can refer to a portable electronic device (e.g., an electronic device easily conveyable by hand by a person of average size) with the capability to present audio and/or visual data (e.g., text, images, videos, music, etc.). For example, a mobile electronic device can comprise at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile electronic device can comprise a volume and/or weight sufficiently small as to permit the mobile electronic device to be easily conveyable by hand. For examples, in some embodiments, a mobile electronic device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile electronic device can weigh less than or equal to 15.6 Newtons, 17.8 Newtons, 22.3 Newtons, 31.2 Newtons, and/or 44.5 Newtons.

Exemplary mobile electronic devices can comprise (i) an iPod®, iPhone®, iTouch®, iPad®, MacBook® or similar product by Apple Inc. of Cupertino, Calif., United States of America, (ii) a Blackberry® or similar product by Research in Motion (RIM) of Waterloo, Ontario, Canada, (iii) a Lumia® or similar product by the Nokia Corporation of Keilaniemi, Espoo, Finland, and/or (iv) a Galaxy™ or similar product by the Samsung Group of Samsung Town, Seoul, South Korea. Further, in the same or different embodiments, a mobile electronic device can comprise an electronic device configured to implement one or more of (i) the iPhone® operating system by Apple Inc. of Cupertino, Calif., United States of America, (ii) the Blackberry® operating system by Research In Motion (RIM) of Waterloo, Ontario, Canada, (iii) the Palm® operating system by Palm, Inc. of Sunnyvale, Calif., United States, (iv) the Android™ operating system developed by the Open Handset Alliance, (v) the Windows Mobile™ operating system by Microsoft Corp. of Redmond, Wash., United States of America, or (vi) the Symbian™ operating system by Nokia Corp. of Keilaniemi, Espoo, Finland.

Further still, the term "wearable user computer device" as used herein can refer to an electronic device with the capability to present audio and/or visual data (e.g., text, images, videos, music, etc.) that is configured to be worn by a user and/or mountable (e.g., fixed) on the user of the wearable user computer device (e.g., sometimes under or over clothing; and/or sometimes integrated with and/or as clothing and/or another accessory, such as, for example, a hat, eyeglasses, a wrist watch, shoes, etc.). In many examples, a wearable user computer device can comprise a mobile electronic device, and vice versa. However, a wearable user computer device does not necessarily comprise a mobile electronic device, and vice versa.

In specific examples, a wearable user computer device can comprise a head mountable wearable user computer device (e.g., one or more head mountable displays, one or more eyeglasses, one or more contact lenses, one or more retinal displays, etc.) or a limb mountable wearable user computer device (e.g., a smart watch). In these examples, a head mountable wearable user computer device can be mountable in close proximity to one or both eyes of a user of the head mountable wearable user computer device and/or vectored in alignment with a field of view of the user.

In more specific examples, a head mountable wearable user computer device can comprise (i) Google Glass™ product or a similar product by Google Inc. of Menlo Park, Calif., United States of America; (ii) the Eye Tap™ product, the Laser Eye Tap™ product, or a similar product by ePI Lab of Toronto, Ontario, Canada, and/or (iii) the Raptyr™ product, the STAR 1200™ product, the Vuzix Smart Glasses M100™ product, or a similar product by Vuzix Corporation of Rochester, N.Y., United States of America. In other specific examples, a head mountable wearable user computer device can comprise the Virtual Retinal Display™ product, or similar product by the University of Washington of Seattle, Wash., United States of America. Meanwhile, in further specific examples, a limb mountable wearable user computer device can comprise the iWatch™ product, or similar product by Apple Inc. of Cupertino, Calif., United States of America, the Galaxy Gear or similar product of Samsung Group of Samsung Town, Seoul, South Korea, the Moto 360 product or similar product of Motorola of Schaumburg, Ill., United States of America, and/or the Zip™ product, One™ product, Flex™ product, Charge™ product, Surge™ product, or similar product by Fitbit Inc. of San Francisco, Calif., United States of America.

In some embodiments, web server 310 can be in data communication through Internet 320 with user computers 330, 331. In certain embodiments, user computers 330, 331 can be desktop computers, laptop computers, smart phones, tablet devices, and/or other endpoint devices. Web server 310 can host one or more websites. For example, web server 310 can host an eCommerce website that allows users to browse and/or search for products, to add products to an electronic shopping cart, and/or to purchase products, in addition to other suitable activities.

In many embodiments, web server 310, Internet 320, and/or user computers 330, 331 can each comprise one or more input devices (e.g., one or more keyboards, one or more keypads, one or more pointing devices such as a computer mouse or computer mice, one or more touchscreen displays, a microphone, etc.), and/or can each comprise one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to the processing module(s) and/or the memory storage module(s) web server 310, Internet 320, and/or user computers 330, 331 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processing module(s) and/or the memory storage module(s). In some embodiments, the KVM switch also can be part of web server 310, Internet 320, and/or user computers 330, 331. In a similar manner, the processing module(s) and the memory storage module(s) can be local and/or remote to each other.

In many embodiments, web server 310 can be configured to communicate with one or more user computers 330, 331. In some embodiments, user computers 330, 331 also can be referred to as customer computers. In some embodiments, web server 310 can communicate or interface (e.g., interact) with one or more customer computers (such as user computers 330, 331) through a network or Internet 320, which can be a public or private network. Internet 320 can be an intranet that is not open to the public. Accordingly, in many embodiments, web server 310 (and/or the software used by such systems) can refer to a back end of system 300 operated by an operator and/or administrator of system 300, and user computers 330, 331 (and/or the software used by such systems) can refer to a front end of system 300 used by one or more users 330, 331, respectively. In some embodiments, users 330, 331 also can be referred to as customers, in which case, user computers 330, 331 can be referred to as customer computers. In these or other embodiments, the operator and/or administrator of system 300 can manage system 300, the processing module(s) of system 300, and/or the memory storage module(s) of system 300 using the input device(s) and/or display device(s) of system 300.

Meanwhile, in many embodiments, web server 310 and/or user computers 330, 340 also can be configured to communicate with one or more databases. The one or more databases can comprise a product database that contains information about products, items, or SKUs (stock keeping units) sold by a retailer. The one or more databases can be stored on one or more memory storage modules (e.g., non-transitory memory storage module(s)), which can be similar or identical to the one or more memory storage module(s) (e.g., non-transitory memory storage module(s)) described above with respect to computer system 100 (FIG. 1). Also, in some embodiments, for any particular database of the one or more databases, that particular database can be stored on a single memory storage module of the memory storage module(s), and/or the non-transitory memory storage module(s) storing the one or more databases or the contents of that particular database can be spread across multiple ones of the memory storage module(s) and/or non-transitory memory storage module(s) storing the one or more databases, depending on the size of the particular database and/or the storage capacity of the memory storage module(s) and/or non-transitory memory storage module(s).

The one or more databases can each comprise a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, IBM DB2 Database, and/or NoSQL Database.

Meanwhile, communication between web server 310, internet 320, user computers 330, 331, and/or the one or more databases can be implemented using any suitable manner of wired and/or wireless communication. Accordingly, system 300 can comprise any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can comprise Bluetooth, Zigbee, Wireless Universal Serial Bus (USB), Z-Wave, etc.; exemplary LAN and/or WAN protocol(s) can comprise Institute of Electrical and Electronic Engineers (IEEE) 802.3 (also known as Ethernet), IEEE 802.11 (also known as WiFi), etc.; and exemplary wireless cellular network protocol(s) can comprise Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can comprise wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can comprise wireless communication hardware including, for example, one or more radio transceivers, one or more infrared transceivers, etc. Additional exemplary communication hardware can comprise one or more networking components (e.g., modulator-demodulator components, gateway components, etc.).

In many embodiments, system 300 can comprise graphical user interface ("GUI") 340, 341. In the same or different embodiments, GUI 340, 341 can be part of and/or displayed by user computers 330, 331, which also can be part of system 300. In some embodiments, GUI 340, 341 can comprise text and/or graphics (image) based user interfaces. In the same or different embodiments, GUI 330, 331 can comprise a heads up display ("HUD"). When GUI 340, 341 comprises a HUD, GUI 340, 341 can be projected onto glass or plastic, displayed in midair as a hologram, or displayed on monitor 106 (FIG. 1). In various embodiments, GUI 340, 341 can be color or black and white. In many embodiments, GUI 340, 341 can comprise an application running on a computer system, such as computer system 100, user computers 330, 331, and/or web server 310. In the same or different embodiments, GUI 340, 341 can be generated by user computers 340, 341. In many embodiments, web server 310 can facilitate a display of and/or transmit instructions to display GUI 340, 341. In various embodiments, GUI 340, 341 can be displayed on user computers 330, 331 prior to an initiation of methods described herein (e.g. methods 400 (FIG. 4), 500 (FIG. 5), and/or 600 (FIG. 6)). In the same or different embodiments, GUI 340, 341 can comprise a website accessed through internet 320. In some embodiments, GUI 340, 341 can comprise an eCommerce website. In the same or different embodiments, GUI 340, 341 can be displayed as or on a virtual reality (VR) and/or augmented reality (AR) system or display.

As described above, development of machine vision systems suffers from a number of problems surrounding the labor and computational intensity of developing training data sets for training machine learning algorithms that operate machine vision systems. As described in further detail below, these problems can be solved by bootstrapping pre-existing libraries of images to train machine vision systems. For example, libraries of stock images can be used. Stock images are particularly applicable to this problem because they can comprise a pre-existing repository of digital images that are pre-labeled with an identity of an item shown in the digital image. This identity label can then be combined with other labels for the item (e.g., labels associated with an item taxonomy) to create a label rich training dataset for a machine learning algorithm without the labor and computationally intensive steps of generating a training data set de novo. In this way, the systems and methods described herein can reduce the computational loads on systems used to generate these training data sets, decrease processing times associated with generating these training data sets, and increase the rate at which trained machine learning algorithms can be implemented in machine vision systems.

Figure 4:
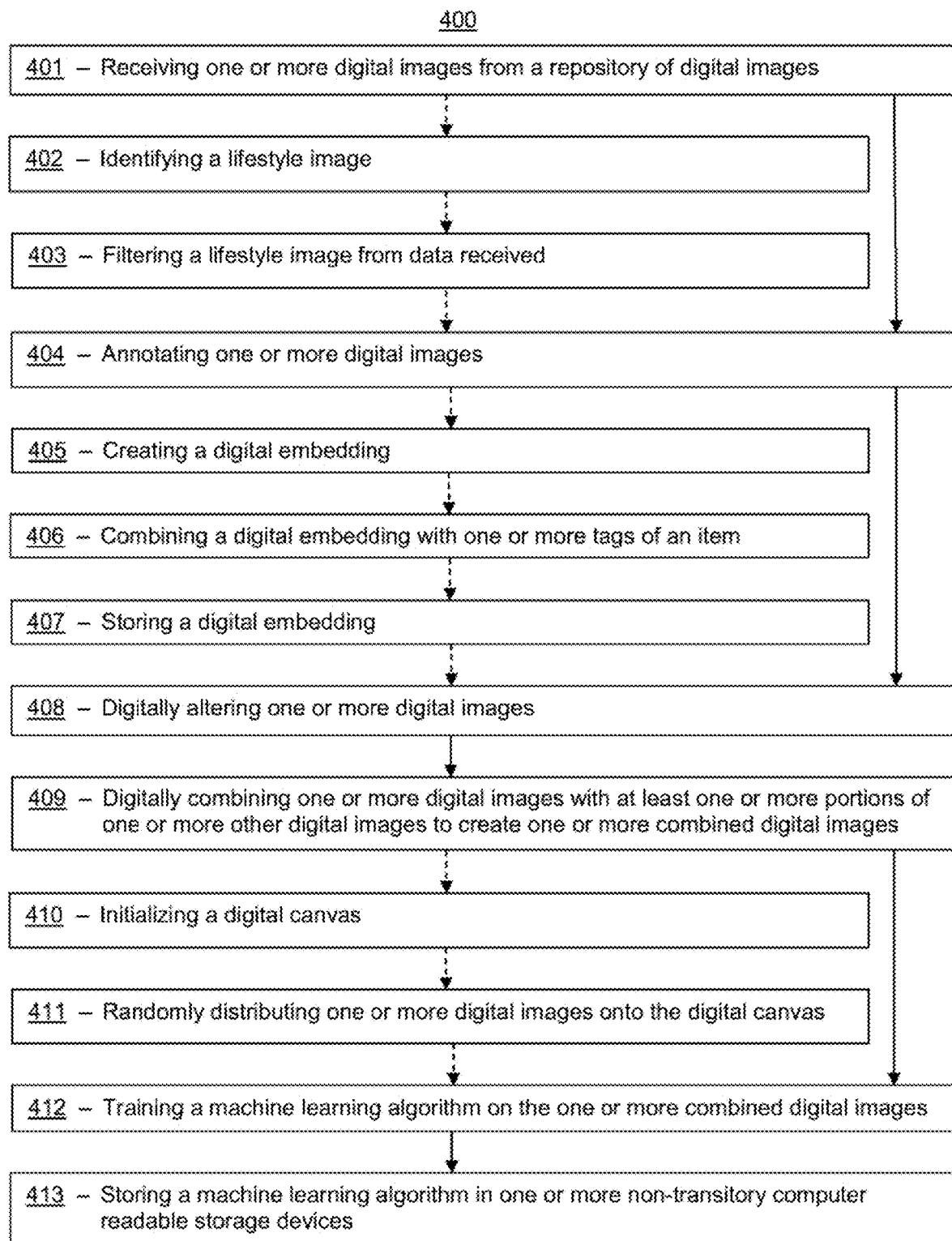
FIG. 4 is a flowchart for a method, according to certain embodiments.

Turning ahead in the drawings, FIG. 4 illustrates a flow chart for a method 400, according to an embodiment. Method 400 is merely exemplary and is not limited to the embodiments presented herein. Method 400 can be employed in many different embodiments or examples not specifically depicted or described herein. In some embodiments, the activities of method 400 can be performed in the order presented. In other embodiments, the activities of method 400 can be performed in any suitable order. In still other embodiments, one or more of the activities of method 400 can be combined or skipped. In many embodiments, system 300 (FIG. 3) can be suitable to perform method 400 and/or one or more of the activities of method 400. In these or other embodiments, one or more of the activities of method 400 can be implemented as one or more computer instructions configured to run at one or more processing modules and configured to be stored at one or more non-transitory memory storage modules. Such non-transitory memory storage modules can be part of a computer system such as web server 310 and/or user computers 330, 331. The processing module(s) can be similar or identical to the processing module(s) described above with respect to computer system 100 (FIG. 1).

In many embodiments, method 400 can comprise an activity 401 of receiving one or more digital images from a repository of digital images. In some embodiments, activity 401 can include optional activities 402 and/or 403. In the same or different embodiments, a repository of digital images can comprise stock images and/or lifestyle images. In the same or different embodiments, a digital image can comprise a stock image or a lifestyle image. In some embodiments, a stock image can comprise an image of only one item. In various embodiments, an item can have multiple stock images. In embodiments where the item can have multiple stock images, each stock image can be photographed from a different angle (e.g. front view of the item, isometric view of the item, side view of the item, top view of the item, bottom view of the item, etc.). In the same or different embodiments, a stock image can comprise a plain background. In many embodiments, a plain background can comprise a single color and/or a pattern recognizable by a machine learning algorithm. In some embodiments, a lifestyle image can comprise an image of multiple items. In the same or different embodiments, items in a stock image can have a unifying theme and/or style (e.g., be the same color, complementary colors, designed using the same design principles, inspired by the same era, be made of the same materials, have the same patterns, have similar patterns, have complementary patterns, etc.) In various embodiments, a lifestyle image can comprise an image of a room comprising one or more pieces of furniture (e.g. a picture of a living room), one or more appliances (e.g. a picture of a kitchen or laundry room), one or more pieces of clothering (e.g. when an embodiment is used for wardrobe recommendation), and/or one or more landscapes (e.g. plants, outdoor furniture, playground structures, etc.). In the same or different embodiments, a lifestyle image can be created by a computer system (e.g. as described below in activities 409-411) and/or be an image taken using a camera.

In some embodiments, stock images and/or lifestyle images can comprise one or more tags identifying items within the image. In the same or different embodiments, one or more tags can comprise levels of an item taxonomy. In many embodiments, an item taxonomy can be configured to classify a catalogue of items based on properties of each item of the catalogue of items. In the same or different embodiments, properties of an item can comprise a title, a description, a price, a brand, a manufacturer, a color, a quantity, a volume, a weight, a material, a style, a pattern, a theme, a recommended use, a color, a fabric, etc. In some embodiments, an item taxonomy can comprise distinct levels of item classification. In further embodiments, distinct levels of item classification can narrow as the distinct levels go deeper into an item taxonomy. In various embodiments, distinct levels of item classification can comprise a super department, a department, a category, and/or a sub-category. In many embodiments, a department can be deeper in an item taxonomy than a super department. In the same or different embodiments, a category can be deeper in an item taxonomy than a department. In some embodiments, a sub-category can be deeper in an item taxonomy than a category. For example, an item taxonomy for Shamrock Farms whole milk can comprise a super department of "Eggs and Dairy," a department of "Milk," a category of "Dairy Milk," and a sub-category of "Whole Milk." As another non-limiting example, an item taxonomy for a sofa can comprise a super department of "Home," a department of "Furniture and Appliances," a category of "Living Room," and a sub-category of "Sofas and Sectionals." In both examples described above, the item taxonomy can be further segmented into brand/manufacturer if needed. In many embodiments, tags of an item can be determined based upon attributes of an item (e.g., properties of an item as described above). In the same or different embodiments, tags of an item can be provided by a seller of an item and/or by a user of an eCommerce website. In many embodiments, user reviews and/or product descriptions can be analyzed by a machine learning algorithm trained to process natural language, and tags of an item can be extracted by the machine learning algorithm. In various embodiments, tags of an item can comprise functional features of an item (e.g., sturdy support, rustic wood, cushion back, upholstered, floral, split sofa, contemporary sofa, residential sofa, rounded legs, etc.).

In many embodiments, method 400 can comprise an activity 402 of identifying a lifestyle image. In some embodiments, a lifestyle image can be identified using a deep learning algorithm trained to determine whether an image is a lifestyle image and/or a stock image. In the same or different embodiments, a deep learning algorithm can be trained on a randomly sampled set of lifestyle images and/or stock images. In some embodiments, a training dataset can be tagged via crowdsourcing. In the same or different embodiments, a convolutional neural network can be used to identify a lifestyle image. In many embodiments, a base network of a deep learning algorithm can comprise a VGG16 algorithm. In the same or different embodiments, a VGG16 algorithm can be pre-trained on ImageNet. In various embodiments, a pre-trained VGG16 algorithm can have its last three full-connected layers removed. In these embodiments, remaining layers of the pre-trained VGG16 algorithm can be treated as a fixed feature extractor for a training data set. In many embodiments, one or more additional layers (e.g., dense layers, batch normalization layers, dropout layers) can be added to a pre-trained VGG16 algorithm. These one or more additional layers can also be tuned and trained as described further herein. In this way, utilizing a pre-trained weights of VGG16 can not only reduce processing times for training a deep learning algorithm, but also reduce data needed to train the deep learning algorithm.

In many embodiments, method 400 can comprise an activity 403 of filtering a lifestyle image from data received from a repository of digital images. In some embodiments, data received from a repository of digital images can comprise a digital image as described above in activity 401 and/or a lifestyle image as described above in activity 402. In the same or different embodiments, data received from a repository can be continually sent (e.g. streamed) using one or more of the communication protocols described above.

In many embodiments, method 400 can comprise an activity 404 of annotating one or more digital images. In some embodiments, annotating one or more digital images can comprise adding tags to the image, as described above. Activity 404 can occur after activity 401 and can include optional activities 405, 406, and/or 407.

In many embodiments, method 400 can optionally comprise an activity 405 of creating a digital embedding. In some embodiments, a digital embedding can be created for a digital image. In the same or different embodiments, annotating a digital image can comprise creating a digital embedding of a digital image. In some embodiments, annotating a digital image can comprise creating an embedding of an item displayed in the digital image. In many embodiments, an embedding can comprise a mapping of a discrete, categorical variable to a vector. In the same or different embodiments, an embedding of a digital image can comprise a vector and/or a set of vectors that describe the contents of the image. In various embodiments, an embedding can comprise a table containing numerical representations of vectors. In many embodiments, an embedding can be created using a machine vision algorithm. In some embodiments, a machine vision algorithm can comprise at least a portion of an image segmentation algorithm and/or an object detection algorithm.

In many embodiments, method 400 can comprise an activity 406 of combining a digital embedding with one or more tags of an item. In various embodiments, tags of an item can correspond to tags as described with reference to activities 401, as described above.

In many embodiments, method 400 can comprise an activity 407 of storing a digital embedding. In some embodiments, a digital embedding can be stored in a data store configured to store high dimensional data. For example, high dimensional data can be stored in Facebook AI Similarity Search (AKA "Faiss") and/or Elastic Search. In the same or different embodiments, high dimensional data can comprise data having a large number of features, thereby leading to "the curse of dimensionality." In some embodiments, an embedding can be stored as a sparse representation in a data store configured to store high dimensional data. Storage efficiency can be improved by encapsulating embeddings into coarser, conceptual embeddings by storing them as a sparse representation. In some embodiments, a sparse representation of an embedding can store only non-zero counts for vectors in the embedding. This technique, then, can reduce required storage space, and can consequently make subsequent reading and/or processing of the sparse representation of an embedding faster than reading and/or processing of embeddings that are not stored as a sparse representation. In many embodiments, a sparse representation of an embedding can be stored in a datastore configured to store high dimensional data, as described above. In many embodiments, a tag of an item, as described above, can be stored in a data store configured to store high dimensional data. In the same or different embodiments, a tag of an item, as described above, can be combined with an embedding or a sparse representation of an embedding, and the combined data can then be stored in a data store configured to store high dimensional data.

In many embodiments, method 400 can comprise an activity 408 of digitally altering one or more digital images. Activity 408 can occur after activity 404. In the same or different embodiments, a digital image can be annotated, as described above, before the digital image is digitally altered. In some embodiments, altering a digital image can comprise enlarging the digital image, shrinking the digital image, rotating the digital image, recoloring the digital image (e.g. converting to greyscale, converting to black and white, altering a color saturation of an image, etc.), flipping the image, mirroring the image, scaling the image, shearing the image and/or any other type of digital image manipulation known in the art of heretofore created.

In many embodiments, method 400 can comprise an activity 409 of digitally combining one or more digital images with at least one or more portions of one or more other digital images to create one or more combined digital images. Activity 409 can occur after activity 408 and can include optional activities 410 and/or 411. In some embodiments, a portion of one or more digital images can comprise a piece of a digital image (e.g. one half, one third, three fourths, etc.). In the same or different embodiments, a portion of one or more digital images can comprise one or more images of a set of digital images. In the same or different embodiments, one or more combined digital images can comprise a combination of digitally altered images, as described above, and/or unaltered digital images. In various embodiments, a combined digital image can comprise multiple copies of the same image and/or copies of different images. In the same or different embodiments, a combined digital image can be a lifestyle image, as described above. In some embodiments, a combined digital image can be stored in a repository of digital images, as described in activity 401 above.

In many embodiments, method 400 can comprise activity 410 of initializing a digital canvas. In some embodiments, a digital canvas can comprise an image file configured to be editable by an image processing software. In various embodiments, an image file can comprise a joint photographic experts group (JPEG) image file, a JPEG file interchange format (JFIF) image, joint photographic experts group 2000 (JPEG 2000) image file, an exchange image file format (Exif) image file, a tagged image file format (TIFF) image file, a graphics interchange format (GIF) image file, a bitmap (BMP) image file, a portable network graphics (PNG) image file, a portable pixmap (PPM) image file, a portable graymap (PGM) image file, a portable bitmap (PBM) image file, a portable any map (PNM) image file, a WebP image file, a high-dynamic-range (HRD) image file (e.g., JPEG-HDR), a high efficiency image file format (HEIF) image file, a better portable graphics (BPG) image file, and/or any other image file types known in the art or heretofore created. In some embodiments, initializing a digital canvas can comprise opening one or more of the above referenced file formats with an image processing and/or image viewing software. In the same or different embodiments, initializing a digital canvas can comprise writing or creating one or more of the above referenced file formats de novo. In many embodiments, a digital canvas can be blank when initialized. In some embodiments, a digital canvas can have image data present when initialized.

In many embodiments, method 400 can comprise activity 411 of randomly distributing one or more digital images onto a digital canvas. In many embodiments, a random number can be assigned to each image of one or more digital images, and the random number can be used to distribute each image onto a digital canvas. In the same or different embodiments, the random number can be used in combination with a coordinate system overlaid onto the digital canvas to randomly distribute the one or more digital images onto the digital canvas. In various embodiments, a Poisson point process can be used to randomly distribute one or more digital images onto a digital canvas. In many embodiments, activity 411 can be modeled as a 2d packing problem (e.g., given a strip of finite width and infinite height, how can one pack items into the strip in ways that minimize the height used), and various heuristics used to solve the 2d packing problem can be used to randomly distribute one or more digital images onto a digital canvas. For example, a 2d packing problem can be solved using a strip packing algorithm, a bin packing algorithm, a hybrid first fit algorithm, a hybrid next fit algorithm, a floor-ceiling algorithms, a finite next-fit algorithm, a finite first fit algorithm, a finite bottom left algorithm, a next bottom-left algorithm, an alternate directions algorithm, etc. In the same or different embodiments, an X-Y coordinate system can be overlaid onto a digital canvas. In these embodiments, a random X-Y coordinate can be assigned to an image of one or more digital images, and the image can be placed on the digital canvas at the X-Y coordinate assigned to the image. In many embodiments, images distributed onto a digital canvas can be overlapped with at least a portion of one or more digital images. In the same or different embodiments, overlapping images on a digital canvas with at least a portion of one or more digital images can comprise placing one or more images on top of or below images on a digital canvas such that a portion of the images on the digital canvas and/or the one or more images are partially obscured.

In some embodiments, it can be desirable to create a more realistic and/or natural lifestyle image. In these embodiments, a set of lifestyle images can be analyzed to determine a rate of co-occurrence between two or more items (e.g., to determine a rate at which two or more items images occur together in the same lifestyle images). In the same or different embodiments, a set of lifestyle images can be analyzed to determine a positional bias of each item in the set of lifestyle images (e.g., which items displayed in a lifestyle image occur close to one another). In various embodiments, a rate of co-occurrence and a positional bias can be used to distribute images on a digital canvas in a semi-random fashion. In many embodiments, an image can be chosen for distribution on a digital canvas based upon a co-occurrence rate of the image with a previously chosen image. In the same or different embodiments, distributing stock images on a digital canvas in semi-random fashion can comprise biasing an assignment of an X-Y coordinate assigned to a stock image. In some embodiments, biasing an assignment of an X-Y coordinate can comprise restricting an X-Y coordinate assigned to an image such that a positional bias rate is satisfied and/or maintained.

In many embodiments, method 400 can comprise an activity 412 of training a machine learning algorithm on one or more combined digital images. In some embodiments, training a machine learning algorithm can comprise estimating internal parameters of a model configured to identify items shown in a digital image. Activity 412 can occur after activity 409. In many embodiments, a digital image can comprise a stock image, a lifestyle image, and/or a combined digital image as described above. In embodiments where multiple items are present in a digital image, a machine learning algorithm can be trained to identify a portion of the multiple items and/or each item of the multiple items. In various embodiments, a machine learning algorithm can be trained using labeled training data, otherwise known as a training dataset. In many embodiments, a training dataset can comprise all or a part of digital images described, created, and/or annotated in activities 401-411. In this way, a machine learning algorithm can be configured to identify an unknown item in a digital image. In the same or different embodiments, a machine learning algorithm can comprise a convolutional neural network (CNN). For example, a CNN can comprise an inception-V3 algorithm, a VGG16/19 algorithm, inception V1/V2/V3 algorithms, res-net (residual network) 50 algorithm, an inception-resnet algorithm, an AlexNet algorithm, a NASNet algorithm, etc. In the same or different embodiments, a pre-trained machine learning algorithm can be used, and the pre-trained algorithm can be re-trained on the labeled training data.

Figure 6:
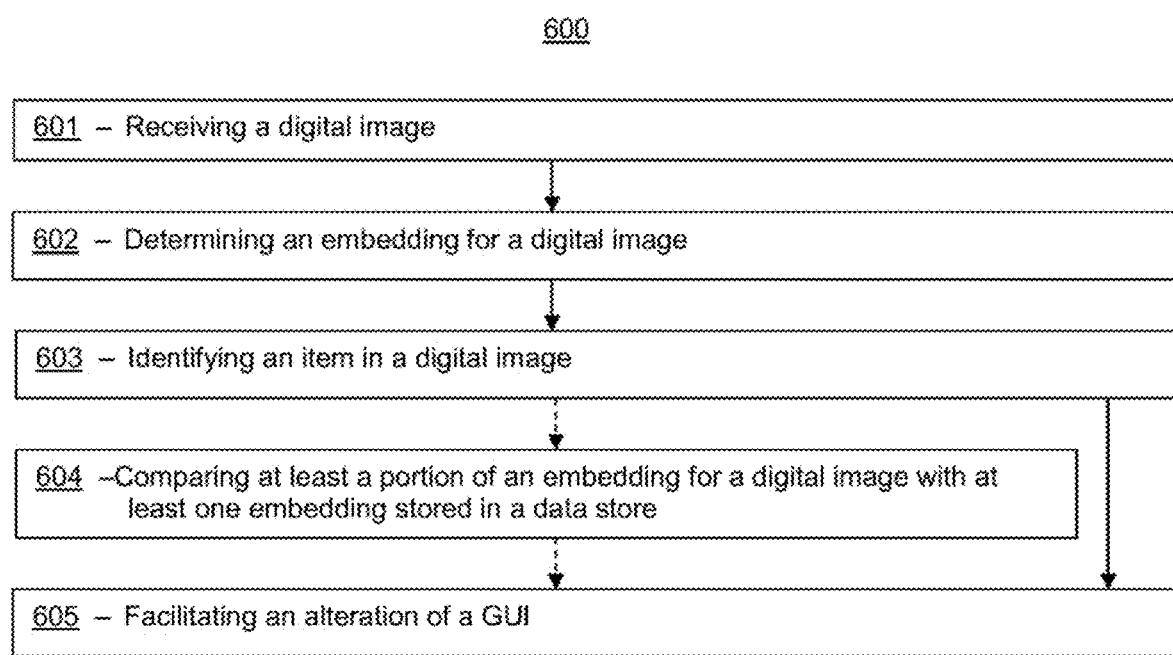
FIG. 6 is a flowchart for a method, according to certain embodiments.

In many embodiments, method 400 can comprise an activity 413 of storing a machine learning algorithm in one or more non-transitory storage devices. In some embodiments, a machine learning algorithm can be stored in a data store configured to store high dimensional data and/or as a sparse representation, as described above with reference to activity 407. In the same or different embodiments, a stored machine learning algorithm can be accessed by a computer system (e.g., computer system 100 (FIG. 1)), and then used to identify unknown items in digital images. In various embodiments, using a stored machine learning algorithm can comprise a method similar and/or identical to method 600 (FIG. 6).

Figure 5:
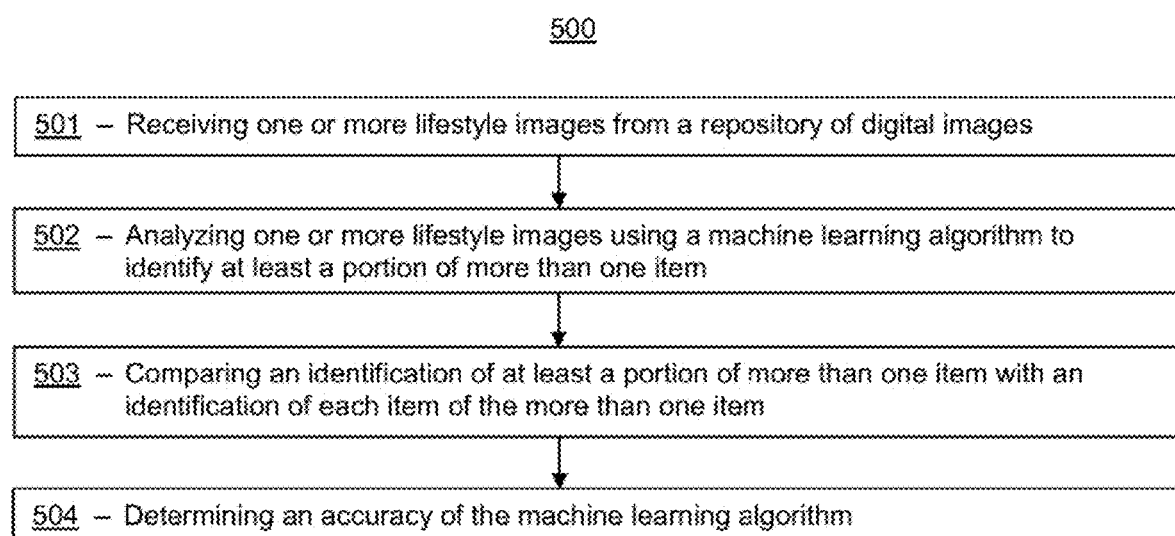
FIG. 5 is a flowchart for a method, according to certain embodiments.

Turning ahead in the drawings, FIG. 5 illustrates a flow chart for a method 500, according to an embodiment. Method 500 is merely exemplary and is not limited to the embodiments presented herein. Method 500 can be employed in many different embodiments or examples not specifically depicted or described herein. In some embodiments, the activities of method 500 can be performed in the order presented. In other embodiments, the activities of method 500 can be performed in any suitable order. In still other embodiments, one or more of the activities of method 500 can be combined or skipped. In various embodiments, method 500 can be performed after and/or simultaneously with method 400 (FIG. 4). In many embodiments, system 300 (FIG. 3) can be suitable to perform method 500 and/or one or more of the activities of method 500. In these or other embodiments, one or more of the activities of method 500 can be implemented as one or more computer instructions configured to run at one or more processing modules and configured to be stored at one or more non-transitory memory storage modules. Such non-transitory memory storage modules can be part of a computer system such as web server 310 and/or user computers 330, 331. The processing module(s) can be similar or identical to the processing module(s) described above with respect to computer system 100 (FIG. 1).

In many embodiments, method 500 can comprise activity 501 of receiving one or more lifestyle images from a repository of digital images. As stated above with reference to method 500, in some embodiments, activity 501 can be performed after and/or simultaneously with method 400 (FIG. 4). In many embodiments, one or more lifestyle images can comprise a lifestyle image as described above with regards to activities 401-404 (FIG. 4) and/or a combined digital image as described in activities 409-411 (FIG. 4). In this way, a machine learning algorithm can be tested on an image comprising known items with known embeddings.

In many embodiments, method 500 can comprise activity 502 of analyzing one or more lifestyle images using a machine learning algorithm to identify at least a portion of more than one item. In some embodiments, a machine learning algorithm can comprise a machine learning algorithm as stored in activity 413 (FIG. 4). In the same or different embodiments, analyzing one or more lifestyle images to identify items in the one or more lifestyle images can comprise determining a digital embedding for the one or more lifestyle images. In various embodiments, a digital embedding can be determined for an image as a whole or for portions of an image (e.g. portions of the image containing one or more items of interest). In some embodiments, a digital embedding can be determined as descried in activity 405 (FIG. 4).

In many embodiments, method 500 can comprise an activity 503 of comparing an identification of at least a portion of more than one item with an identification of each item of the more than one item. In some embodiments, an identification of an item can comprise an embedding, as described above. In the same or different embodiments, comparing an identification can comprise comparing an embedding, as determined in activity 503, with an embedding as determined in activities 405-407 (FIG. 4). In many embodiments, a similarity between two embeddings can be determined. In the same or different embodiments, when a similarity between two embeddings is above a predetermined threshold, it can be determined that a machine learning algorithm correctly identified an item present in a lifestyle image.

In many embodiments, method 500 can comprise an activity 504 of determining an accuracy of a machine learning algorithm. In some embodiments, an accuracy of a machine learning algorithm can be determined by summing a number of correct identifications of items present in a lifestyle image, and then by dividing the number of correct identifications by a total number of identification attempts. In the same or different embodiments, an accuracy of a machine learning algorithm can be determined by summing a number of incorrect identifications of items present in a lifestyle image, and then by dividing the number of correct identifications by a total number of identification attempts.

Turning ahead in the drawings, FIG. 6 illustrates a flow chart for a method 600, according to an embodiment. Method 600 is merely exemplary and is not limited to the embodiments presented herein. Method 600 can be employed in many different embodiments or examples not specifically depicted or described herein. In some embodiments, the activities of method 600 can be performed in the order presented. In other embodiments, the activities of method 600 can be performed in any suitable order. In still other embodiments, one or more of the activities of method 600 can be combined or skipped. In various embodiments, method 500 can be performed after and/or simultaneously with method 400 (FIG. 4) and/or method 500 (FIG. 5). In many embodiments, system 300 (FIG. 3) can be suitable to perform method 600 and/or one or more of the activities of method 600. In these or other embodiments, one or more of the activities of method 600 can be implemented as one or more computer instructions configured to run at one or more processing modules and configured to be stored at one or more non-transitory memory storage modules. Such non-transitory memory storage modules can be part of a computer system such as web server 310 and/or user computers 330, 331. The processing module(s) can be similar or identical to the processing module(s) described above with respect to computer system 100 (FIG. 1).

In many embodiments, method 600 can comprise an activity 601 of receiving a digital image. In some embodiments, a digital image can comprise multiple items. In various embodiments, a digital image can comprise a stock image, a combined digital image, and/or a lifestyle image, as described above with reference to activities 401-411 (FIG. 4). In various embodiments, a digital image can be received from an electronic device of a user, such as user computer 330, 331. In the same or different embodiments, a digital image can be taken using a camera coupled to an electronic device of a user.

In many embodiments, method 600 can comprise an activity 602 of determining an embedding for a digital image. In some embodiments, an embedding can be determined using a machine learning algorithm. In the same or different embodiments, the machine learning algorithm can be the same as a machine learning algorithm described in activity 412 (FIG. 4).

In many embodiments, method 600 can comprise an activity 603 of identifying an item in a digital image. In some embodiments, a digital image can be a digital image as described in activities 401-411 (FIG. 4) and/or activity 601. In the same or different embodiments, an item in a digital image can be identified as described in activity 502 (FIG. 5). In many embodiments, activity 603 can optionally comprise an activity 604 of comparing at least a portion of an embedding for a digital image with at least one embedding stored in a data store. In the same or different embodiments, a data store can comprise a data store configured to store high dimensional data, as described in activities 407 and/or 413.

In many embodiments, method 600 can comprise an activity 605 of facilitating an alteration of a GUI. Activity 605 can occur after activity 603. In some embodiments, a GUI can comprise GUI 340, 341. In the same or different embodiments, activity 605 can be performed in response to identifying the item in the digital image, as described in activities 502 (FIG. 5) and/or 603. In many embodiments, altering a GUI can comprise customizing a content of a GUI. In the same or different embodiments, customizing a content on a GUI can comprise altering an image displayed on the GUI, altering text on the GUI, altering a layout of the GUI, changing a type of the GUI, displaying an advertisement on the GUI, displaying no advertisement on the GUI, altering a color displayed on the GUI, etc. In many embodiments, customizing a content on a GUI can comprise displaying certain content at specific times. In further embodiments, a content on a GUI can comprise advertisements for products, services, and/or events. In some embodiments, facilitating an alteration of a GUI can comprise embedding a selectable element in a digital image. In various embodiments, facilitating an alteration of a GUI can comprise overlaying, over a digital image, a selectable element. In many embodiments, an area of a selectable element can be determined using the CNN, as described above. In the same or different embodiments, a selectable element can comprise a hyperlink that, when selected, navigates an electronic device to a webpage displaying an item displayed in the digital image. In many embodiments, the webpage can be configured to offer the item for sale to the user. In the same or different embodiments, altering a GUI can comprise facilitating a display of an item similar to an item in a digital image (e.g., an item of a different size, color, style, etc.). In many embodiments, altering a GUI can comprise facilitating a display of an item complimentary to an item in a digital image (e.g., an item of a complementary size, color, style, etc.).

Figure 7:
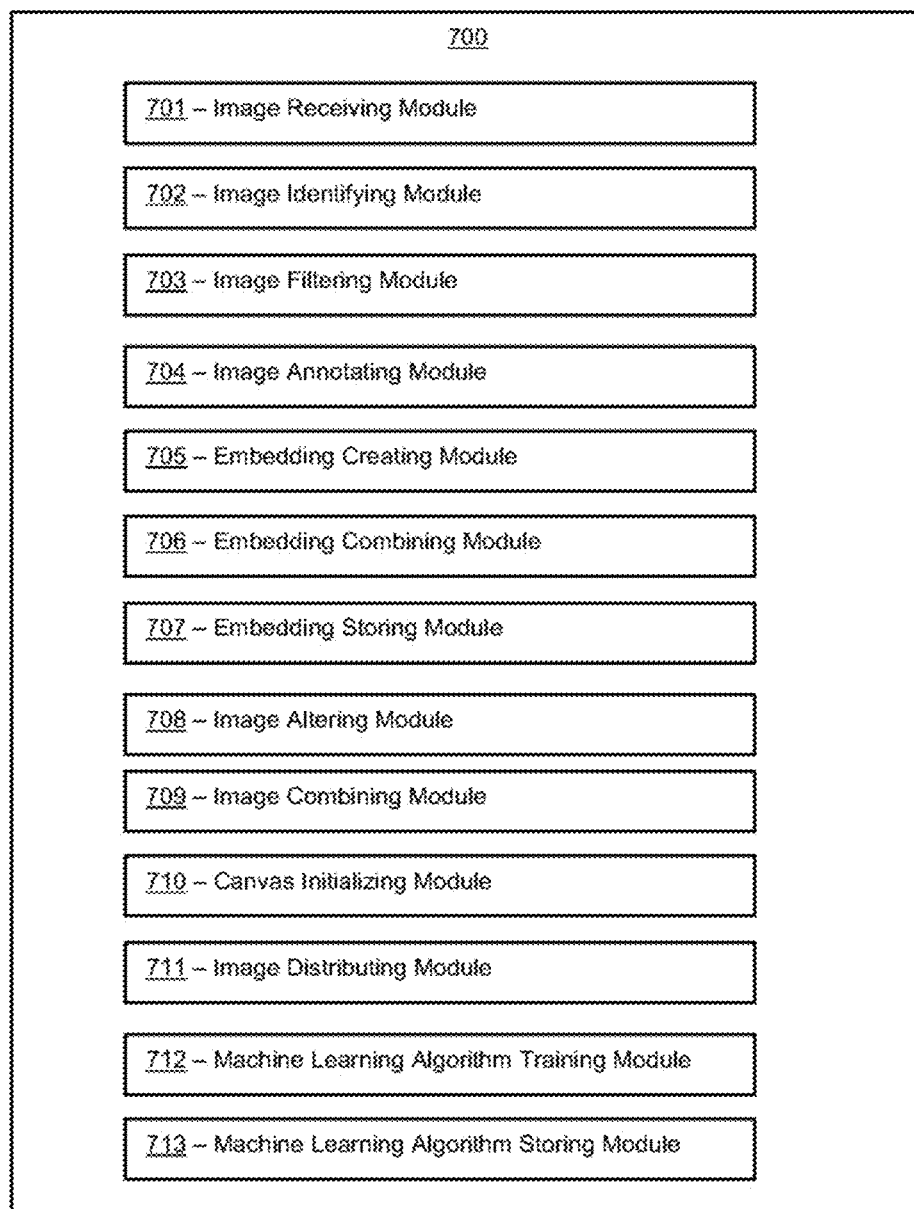
FIG. 7 illustrates a representative block diagram of a system, according to an embodiment.

Turning ahead in the drawings, FIG. 7 illustrates a block diagram of a system 700 that can be employed for behavior based messaging. System 700 is merely exemplary and embodiments of the system are not limited to the embodiments presented herein. System 700 can be employed in many different embodiments or examples not specifically depicted or described herein. In some embodiments, certain elements or modules of system 700 can perform various procedures, processes, and/or activities. In these or other embodiments, the procedures, processes, and/or activities can be performed by other suitable elements or modules of system 700.

Generally, therefore, system 700 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 700 described herein.

In many embodiments, system 700 can comprise non-transitory memory storage module 701. Memory storage module 701 can be referred to as image receiving module 701. In many embodiments, image receiving module 701 can store computing instructions configured to run on one or more processing modules and perform one or more acts of method 400 (FIG. 4) (e.g., activity 401 (FIG. 4)).

In many embodiments, system 700 can comprise non-transitory memory storage module 702. Memory storage module 702 can be referred to as image identifying module 702. In many embodiments, image identifying module 702 can store computing instructions configured to run on one or more processing modules and perform one or more acts of method 400 (FIG. 4) (e.g., activity 402 (FIG. 4)).

In many embodiments, system 700 can comprise non-transitory memory storage module 703. Memory storage module 703 can be referred to as image filtering module 703. In many embodiments, image filtering module 703 can store computing instructions configured to run on one or more processing modules and perform one or more acts of method 400 (FIG. 4) (e.g., activity 403 (FIG. 4)).

In many embodiments, system 700 can comprise non-transitory memory storage module 704. Memory storage module 704 can be referred to as image annotating module 704. In many embodiments, image annotating module 704 can store computing instructions configured to run on one or more processing modules and perform one or more acts of method 400 (FIG. 4) (e.g., activity 404 (FIG. 4)).

In many embodiments, system 700 can comprise non-transitory memory storage module 705. Memory storage module 705 can be referred to as embedding creating module 705. In many embodiments, embedding creating module 705 can store computing instructions configured to run on one or more processing modules and perform one or more acts of method 400 (FIG. 4) (e.g., activity 405 (FIG. 4)).

In many embodiments, system 700 can comprise non-transitory memory storage module 706. Memory storage module 706 can be referred to as embedding combining module 706. In many embodiments, embedding combining module 706 can store computing instructions configured to run on one or more processing modules and perform one or more acts of method 400 (FIG. 4) (e.g., activity 406 (FIG. 4)).

In many embodiments, system 700 can comprise non-transitory memory storage module 707. Memory storage module 707 can be referred to as embedding storing module 707. In many embodiments, embedding storing module 707 can store computing instructions configured to run on one or more processing modules and perform one or more acts of method 400 (FIG. 4) (e.g., activity 407 (FIG. 4)).

In many embodiments, system 700 can comprise non-transitory memory storage module 708. Memory storage module 708 can be referred to as image altering module 708. In many embodiments, image altering module 708 can store computing instructions configured to run on one or more processing modules and perform one or more acts of method 400 (FIG. 4) (e.g., activity 408 (FIG. 4)).

In many embodiments, system 700 can comprise non-transitory memory storage module 709. Memory storage module 709 can be referred to as image combining module 709. In many embodiments, image combining module 709 can store computing instructions configured to run on one or more processing modules and perform one or more acts of method 400 (FIG. 4) (e.g., activity 409 (FIG. 4)).

In many embodiments, system 700 can comprise non-transitory memory storage module 710. Memory storage module 710 can be referred to as canvas initializing module 710. In many embodiments, canvas initializing module 710 can store computing instructions configured to run on one or more processing modules and perform one or more acts of method 400 (FIG. 4) (e.g., activity 410 (FIG. 4)).

In many embodiments, system 700 can comprise non-transitory memory storage module 711. Memory storage module 711 can be referred to as image distributing module 711. In many embodiments, image distributing module 711 can store computing instructions configured to run on one or more processing modules and perform one or more acts of method 400 (FIG. 4) (e.g., activity 411 (FIG. 4)).

In many embodiments, system 700 can comprise non-transitory memory storage module 712. Memory storage module 712 can be referred to as machine learning algorithm training module 712. In many embodiments, machine learning algorithm training module 712 can store computing instructions configured to run on one or more processing modules and perform one or more acts of method 400 (FIG. 4) (e.g., activity 412 (FIG. 4)).

In many embodiments, system 700 can comprise non-transitory memory storage module 713. Memory storage module 713 can be referred to as machine learning algorithm storing module 713. In many embodiments, strict model display module 713 can store computing instructions configured to run on one or more processing modules and perform one or more acts of method 400 (FIG. 4) (e.g., activity 413 (FIG. 4)).

Figure 8:
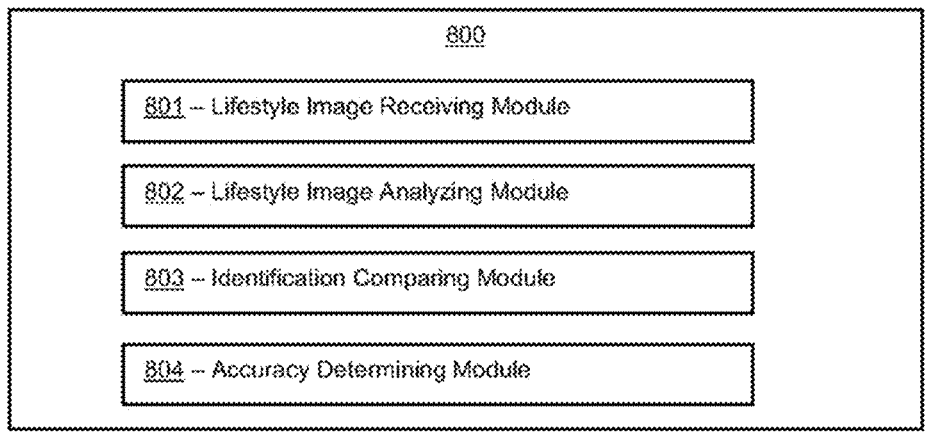
FIG. 8 illustrates a representative block diagram of a system, according to an embodiment.

Turning ahead in the drawings, FIG. 8 illustrates a block diagram of a system 800 that can be employed for behavior based messaging. System 800 is merely exemplary and embodiments of the system are not limited to the embodiments presented herein. System 800 can be employed in many different embodiments or examples not specifically depicted or described herein. In some embodiments, certain elements or modules of system 800 can perform various procedures, processes, and/or activities. In these or other embodiments, the procedures, processes, and/or activities can be performed by other suitable elements or modules of system 800.

Generally, therefore, system 800 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 800 described herein.

In many embodiments, system 800 can comprise non-transitory memory storage module 801. Memory storage module 801 can be referred to as lifestyle image receiving module 801. In many embodiments, lifestyle image receiving module 801 can store computing instructions configured to run on one or more processing modules and perform one or more acts of method 500 (FIG. 5) (e.g., activity 501 (FIG. 5)).

In many embodiments, system 800 can comprise non-transitory memory storage module 802. Memory storage module 802 can be referred to as lifestyle image analyzing module 802. In many embodiments, lifestyle image analyzing module 802 can store computing instructions configured to run on one or more processing modules and perform one or more acts of method 500 (FIG. 5) (e.g., activity 502 (FIG. 5)).

In many embodiments, system 800 can comprise non-transitory memory storage module 803. Memory storage module 803 can be referred to as identification comparing module 803. In many embodiments, identification comparing module 803 can store computing instructions configured to run on one or more processing modules and perform one or more acts of method 500 (FIG. 5) (e.g., activity 503 (FIG. 5)).

In many embodiments, system 800 can comprise non-transitory memory storage module 804. Memory storage module 804 can be referred to as accuracy determining module 804. In many embodiments, accuracy determining module 804 can store computing instructions configured to run on one or more processing modules and perform one or more acts of method 500 (FIG. 5) (e.g., activity 504 (FIG. 5)).

Figure 9:
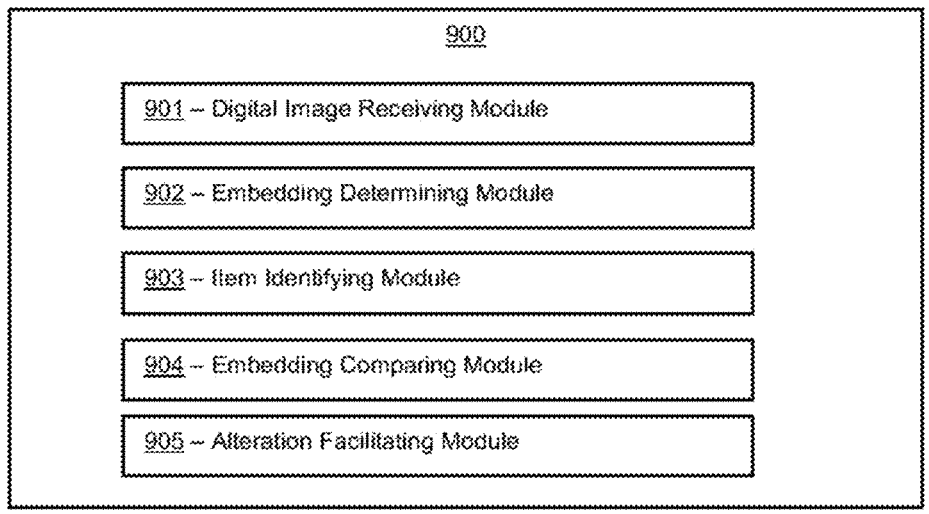
FIG. 9 illustrates a representative block diagram of a system, according to an embodiment.

Turning ahead in the drawings, FIG. 9 illustrates a block diagram of a system 900 that can be employed for behavior based messaging. System 900 is merely exemplary and embodiments of the system are not limited to the embodiments presented herein. System 900 can be employed in many different embodiments or examples not specifically depicted or described herein. In some embodiments, certain elements or modules of system 900 can perform various procedures, processes, and/or activities. In these or other embodiments, the procedures, processes, and/or activities can be performed by other suitable elements or modules of system 900.

Generally, therefore, system 900 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 900 described herein.

In many embodiments, system 900 can comprise non-transitory memory storage module 901. Memory storage module 901 can be referred to as digital image receiving module 901. In many embodiments, digital image receiving module 901 can store computing instructions configured to run on one or more processing modules and perform one or more acts of method 600 (FIG. 6) (e.g., activity 601 (FIG. 6)).

In many embodiments, system 900 can comprise non-transitory memory storage module 902. Memory storage module 902 can be referred to as embedding determining module 902. In many embodiments, embedding determining module 902 can store computing instructions configured to run on one or more processing modules and perform one or more acts of method 600 (FIG. 6) (e.g., activity 602 (FIG. 6)).

In many embodiments, system 900 can comprise non-transitory memory storage module 903. Memory storage module 903 can be referred to as item identifying module 903. In many embodiments, item identifying module 903 can store computing instructions configured to run on one or more processing modules and perform one or more acts of method 600 (FIG. 6) (e.g., activity 603 (FIG. 6)).

In many embodiments, system 900 can comprise non-transitory memory storage module 904. Memory storage module 904 can be referred to as embedding comparing module 904. In many embodiments, embedding comparing module 904 can store computing instructions configured to run on one or more processing modules and perform one or more acts of method 600 (FIG. 6) (e.g., activity 604 (FIG. 6)).

In many embodiments, system 900 can comprise non-transitory memory storage module 905. Memory storage module 905 can be referred to as alteration facilitating module 905. In many embodiments, alteration facilitating module 905 can store computing instructions configured to run on one or more processing modules and perform one or more acts of method 600 (FIG. 6) (e.g., activity 605 (FIG. 6)).

Although systems and methods for identifying items in a digital image have been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-9 may be modified, and that the foregoing discussion of certain of these embodiments does not necessarily represent a complete description of all possible embodiments. For example, one or more of the procedures, processes, or activities of FIG. 4 may include different procedures, processes, and/or activities and be performed by many different modules, in many different orders.

All elements claimed in any particular claim are essential to the embodiment claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:
   one or more processors; and
   one or more non-transitory computer-readable storage devices storing computing instructions configured to run on the one or more processors and perform:
   receiving a digital image comprising multiple items;
   determining an embedding for the digital image using a predictive algorithm trained on one or more combined digital images, wherein the one or more combined digital images:

comprise one or more annotated digital images; and
are created by digitally altering and digitally combining the one or more annotated digital images; and identifying an item of the multiple items in the digital image.

2. The system of claim 1, wherein identifying the item of the multiple items in the digital image comprises:
comparing at least a portion of the embedding for the digital image with at least one other embedding; and
when at least the portion of the embedding for the digital image is similar to the at least one other embedding, identifying the item of the multiple items in the digital image based on at least one of the portion of the embedding for the digital image or the at least one other embedding.

3. The system of claim 1, wherein the computing instructions are further configured to run on the one or more processors and perform:
embedding, in the digital image, a selectable element that, when selected, navigates an internet browser on an electronic device to a webpage displaying the item of the multiple items.

4. The system of claim 1, wherein the computing instructions are further configured to run on the one or more processors and perform:
overlaying over the digital image a selectable element that, when selected, navigates an internet browser on an electronic device to a webpage displaying the item of the multiple items.

5. The system of claim 1, wherein the computing instructions are further configured to run on the one or more processors and perform one or more of:
facilitating displaying a second item similar to the item; or
facilitating displaying a third item complementary to the item.

6. The system of claim 1, wherein the one or more combined digital images are further created by:
receiving one or more digital images from a repository of digital images; and
annotating the one or more digital images from the repository of digital images.

7. The system of claim 1, wherein digitally altering and digitally combining the one or more annotated digital images comprises:
initializing a digital canvas; and
randomly distributing the one or more annotated digital images, as altered, onto the digital canvas to create a lifestyle image comprising the multiple items.

8. The system of claim 7, wherein randomly distributing the one or more annotated digital images comprises overlapping the one or more annotated digital images with at least a portion of one or more other annotated digital images.

9. The system of claim 1, wherein digitally altering the one or more annotated digital images comprises at least one of:
enlarging the one or more annotated digital images;
shrinking the one or more annotated digital images;
rotating the one or more annotated digital images;
recoloring the one or more annotated digital images; or
flipping the one or more annotated digital images.

10. The system of claim 1, wherein the machine learning predictive algorithm comprises a convolutional neural network.

11. A method implemented via execution of computing instructions configured to run at one or more processors and configured to be stored at non-transitory computer-readable media, the method comprising:
receiving a digital image comprising multiple items;
determining an embedding for the digital image using a predictive algorithm trained on one or more combined digital images, wherein the one or more combined digital images:
comprise one or more annotated digital images; and
are created by digitally altering and digitally combining the one or more annotated digital images; and
identifying an item of the multiple items in the digital image.

12. The method of claim 11, wherein identifying the item of the multiple items in the digital image comprises:
comparing at least a portion of the embedding for the digital image with at least one other embedding; and
when at least the portion of the embedding for the digital image is similar to the at least one other embedding, identifying the item of the multiple items in the digital image based on at least one of the portion of the embedding for the digital image or the at least one other embedding.

13. The method of claim 11 further comprising:
embedding, in the digital image, a selectable element that, when selected, navigates an internet browser on an electronic device to a webpage displaying the item of the multiple items.

14. The method of claim 11 further comprising:
overlaying over the digital image a selectable element that, when selected, navigates an internet browser on an electronic device to a webpage displaying the item of the multiple items.

15. The method of claim 11 further comprising one or more of:
facilitating displaying a second item similar to the item; or
facilitating displaying a third item complementary to the item.

16. The method of claim 11, wherein the one or more combined digital images are further created by:
receiving one or more digital images from a repository of digital images; and
annotating the one or more digital images from the repository of digital images.

17. The method of claim 11, wherein digitally altering and digitally combining the one or more annotated digital images comprises:
initializing a digital canvas; and
randomly distributing the one or more annotated digital images, as altered, onto the digital canvas to create a lifestyle image comprising the multiple items.

18. The method of claim 17, wherein randomly distributing the one or more annotated digital images comprises overlapping the one or more annotated digital images with at least a portion of one or more other annotated digital images.

19. The method of claim 11, wherein digitally altering the one or more annotated digital images comprises at least one of:
enlarging the one or more annotated digital images;
shrinking the one or more annotated digital images;
rotating the one or more annotated digital images;
recoloring the one or more annotated digital images; or
flipping the one or more annotated digital images.

20. The method of claim 11, wherein the predictive algorithm comprises a convolutional neural network.

* * * * *